United States Patent Office 3,337,586
Patented Aug. 22, 1967

3,337,586
SELECTED 4 - HEXAFLUOROISOPROPYLIDENE-
2,2 - BIS(HYDROCARBYL) - 1,3 - DITHIETANES
AND DERIVATIVES
Maynard S. Raasch, Fairfax, Del., assignor to E. I. du
Pont de Nemours and Company, Wilmington, Del., a
corporation of Delaware
No Drawing. Filed Sept. 28, 1964, Ser. No. 399,853
14 Claims. (Cl. 260—327)

ABSTRACT OF THE DISCLOSURE

Selected fluorinated 1,3-diethietanes, e.g., 2,2-diphenyl-
and 2,2-bis(trifluoromethyl)4-[2,2,2 - trifluoro - 1 - (tri-
fluoromethyl)ethylidene]1,3 - dithietane, useful as anti-
static agents for wool, and their preparation from bis(tri-
fluoromethyl)thioketene and a thioketone or dialkyl-
aminoaryl aldehyde.

Description of the invention

This invention relates to, and has as its principal ob-
jects provision of, a novel type of fluorinated 1,3-di-
thietanes and methods for preparing these compounds.

The new products of this invention are 4-hexa-fluoro-
isopropylidene-2,2-bis(hydrocarbyl and substituted hy-
drocarbyl)-1,3-dithietanes of the general formula

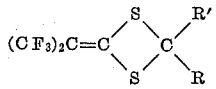

where R and R' individually are lower alkyl, lower fluoro-
alkyl, cycloalkyl of 5 to 6 ring carbons, or 1 to 2 ring
aryl having from 0 to 2 substituents which can be halo-
gen, lower alkyl, lower alkoxy or lower dialkylamino,
with the proviso that R can be hydrogen when R' is di-
alkylaminoaryl; and R and R' together are a divalent
alkylene group forming a 5- to 7-membered ring with the
dithietane carbon. It will be understood that R and R'
can be jointly represented by a single symbol such as Q.

These products are prepared by one of the following
two methods.

(I) Bis(trifluoromethyl)thioketene is reacted at a
temperature in the range of —20 to 50° C. with a thio-
ketone of the formula

where R and R' have the previously given significance,
except that, of course, neither one is hydrogen in ac-
cordance with the equation I. 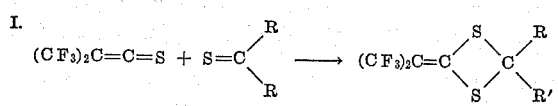

(II) A second method, specifically applicable to the
preparation of the products of this invention in which R
and R' are both dialkylaminoaryl, or one of them is hy-
drogen, involves the reaction at a temperature in the
range of —20 to 50° C. of bis(trifluoromethyl)thioketene
with a bis(dialkylaminoaryl)ketone or a dialkylamino-
aryl aldehyde, in which reaction bis(trifluoromethyl)ke-
tene is the by-product, in accordance with the equation II 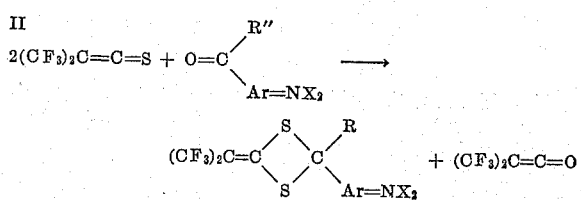

where R" is Ar-NX$_2$, in the case of a ketone, or H, in
the case of an aldehyde; Ar is 1–2 ring arylene, and X
is lower alkyl.

In naming the compounds of this invention, the fluo-
rinated group in the 4-position of the 1,3-dithietane can
be called 2,2,2-trifluoro-1-(trifluoromethyl)ethylidene, ac-
cording to accepted rules. A shorter, definitive but un-
official name for this group is hexafluoroisopropylidene.
Both nomenclatures are used in this discussion.

The starting material, bis(trifluoromethyl)thioketene,
used in the processes of this invention, is a new com-
pound described and claimed in my U.S. Patent 3,275,609.
Detailed procedure for preparing the compound is given
in the patent.

In the first method of this invention, the reaction of
bis(trifluoromethyl)ketene with a thioketone can take
place at low temperature, e.g., —20° C. There is no ad-
vantage, and it may sometimes be undesirable, to exceed
a temperature of about 50° C. The preferred tempera-
ture range is 0–50° C., as no special equipment is then
required. If the thioketone is particularly unstable, it
may be desirable to mix the reactants at a temperature
below 0° C. and allow them to warm up if reaction is
not complete. If the thioketone is a liquid, the reaction
can be carried out without or with a solvent. If the thio-
ketone is a solid, it is convenient to dissolve it in an
inert solvent such as a hydrocarbon or halogenated hy-
drocarbon. Examples of suitable solvents are n-hexane,
cyclohexane, benzene, toluene, dichloromethane, carbon
tetrachloride, dichlorotetrafluoroethane, 1,1,2-trichloro-
1,2,2-trifluoroethane, chlorobenzene, and the like.

The relative proportions of the two reactants are not
critical, as the reaction will proceed regardless of what
they are. As a matter of convenience, approximately
equimolar amounts are normally used, but an excess of
one or the other reactant, particularly bis(trifluoro-
methyl)thioketene, can be employed.

The thioketones suitable for use in this process are
known compounds, preparable by methods described in
the literature. For example, a list of known aliphatic
and cycloaliphatic thioketones has been published by
Mayer and Fabian [Angew. Chem. (International Ed.),
3, 283 (1964)].

In the second method of this invention, i.e., the re-
action of bis(trifluoromethyl)thioketene with a dialkyl-
aminoaryl ketone or aldehyde, the operating conditions
with respect to temperature and solvents are the same
as described above for method I. Here again, the rela-
tive proportions of the two reactants are not critical, but it is preferred to use approximately two moles of bis(trifluoromethyl)thioketene per mole of ketone or aldehyde reactant.

In either process, the reaction product is isolated by any convenient method, such as removal of the solvent, if any is used, and recovery of the product by distillation or by crystallization from an appropriate solvent.

Embodiments of the invention

There follow some nonlimiting examples illustrative of the invention. In these examples, temperatures are 10–25° C. and pressures are ambient unless otherwise noted.

EXAMPLE 1

*2,2-diphenyl-4-[2,2,2-trifluoro-1-(trifluoromethyl)ethylidene]-1,3-dithietane*

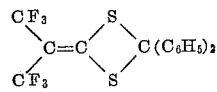

Bis(trifluoromethyl)thioketene was added to an equimolar amount of thiobenzophenone dissolved in eight times its weight of dichloromethane. The blue color of the thiobenzophenone was discharged. The solvent was evaporated, and the syrupy residue crystallized on standing. Recrystallization from methanol left a 77% yield of the white dithietane, M.P. 59–59.5° C.

*Analysis.*—Calc'd. for $C_{17}H_{10}F_6S_2$: C, 52.04; H, 2.57; S, 16.34. Found: C, 52.06; H, 2.70; S, 16.29.

In agreement with the structure, the $F^{19}$ nuclear magnetic resonance spectrum has a single peak.

EXAMPLE 2

*2,2-bis(p-dimethylaminophenyl)-4-[2,2,2-trifluoro-1-(trifluoromethyl)ethylidene]-1,3-dithietane*

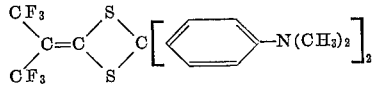

Two moles of bis(trifluoromethyl)thioketene was added to one mole of 4,4'-bis(dimethylamino)thiobenzophenone dissolved in 28 times its weight of dichloromethane, with cooling in ice, and the solution was allowed to stand for 15 hours. The solvent was removed, and the residue was recrystallized from cyclohexane to give a 73% yield of the dithietane which was white but readily assumed a greenish discoloration. An analytical sample was recrystallized again from carbon tetrachloride and melted at 137–138° C.

*Analysis.*—Calc'd. for $C_{21}H_{20}F_6N_2S_2$: C, 52.70; H, 4.21; S, 13.40. Found: C, 52.78; H, 4.34; S, 13.45.

In agreement with the structure, the $F^{19}$ nuclear magnetic resonance spectrum has a single peak. The infrared absorption of the exocyclic double bond is at 6.20μ.

EXAMPLE 3

The compound of Example 2 was made by the second process described above.

Bis(trifluoromethyl)thioketene was added to a half-molar equivalent of 4,4'-bis(dimethylamino)benzophenone, dissolved in 6 times its weight of dichloromethane, with stirring and cooling in ice. Bis(trifluoromethyl) ketene was evolved. The solvent was evaporated, and the residue was recrystallized from cyclohexane to give a 64% yield of the compound obtained in Example 2. An analytical sample was recrystallized from carbon tetrachloride.

*Analysis.*—Found: C, 52.48; H, 4.22; S, 13.53.

EXAMPLE 4

*2-(p-dimethylaminophenyl)-4-[2,2,2-trifluoro-1-(trifluoromethyl)ethylidene]-1,3-dithietane*

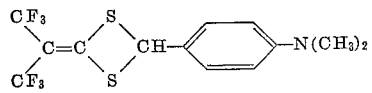

This compound was made by the second process.

Bis(trifluoromethyl)thioketene was added to a half-molar quantity of p-dimethylaminobenzaldehyde dissolved in 12 times its weight of dichloromethane. Bis(trifluoromethyl)ketene was evolved. The solvent was evaporated and the residue was recrystallized from hexane to give a 77% yield of the white dithietane, M.P. 148–149° C.

*Analysis.*—Calc'd for $C_{13}H_{11}F_6NS_2$: C, 43.44; H, 3.09; S, 17.85. Found: C, 43.75; H, 3.55; S, 17.95.

In agreement with the structure, the $F^{19}$ nuclear magnetic resonance spectrum is a singlet. The infrared spectrum shows a band at 6.25μ for the exocyclic double bond.

EXAMPLE 5

*2-(p-diethylaminophenyl)-4-[2,2,2-trifluoro-1-(trifluoromethyl)ethylidene]-1,3-dithietane*

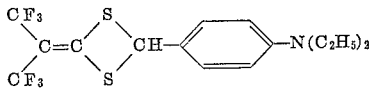

This compound was made by the second process.

Bis(trifluoromethyl)thioketene was added to a half-molar equivalent of p-diethylaminobenzaldehyde dissolved in 7 times its weight of dichloromethane. The solvent was removed, and the residue was recrystallized from methanol to give a 28% yield of the white dithietane, M.P. 81–82° C.

*Analysis.*—Calc'd for $C_{15}H_{15}F_6NS_2$: C, 46.50; H, 3.90; S, 16.55. Found: C, 47.15; H, 3.97; S, 16.73.

The $F^{19}$ nuclear magnetic resonance spectrum is a singlet.

EXAMPLE 6

*2,2-bis(trifluoromethyl)-4-[2,2,2-trifluoro-1-(trifluoromethyl)ethylidene]-1,3-dithietane*

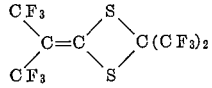

Bis(trifluoromethyl)thioketene was added to an equimolar amount of hexafluorothioacetone (U.S. Patent 2,970,173) at 0° C. and allowed to stand at 0° C. for 3 hours. Distillation gave a 53% yield of the colorless dithietane, B.P. 126–127° C., $n_D^{25}$ 1.3669.

*Analysis.*—Calc'd for $C_7F_{12}S_2$: C, 22.35; S, 17.05. Found: C, 22.39; S, 17.11.

In accord with the structure, the $F^{19}$ nuclear magnetic resonance spectrum consists of two singlets. The infrared absorption shows C=C absorption at 6.11μ.

The foregoing detailed examples illustrate the preparation of specific products of this invention. Application of the first method, as in Examples 1, 2 and 6, to other thioketones, and of the second method, as in Examples 3–5, to other dialkylaminoaryl aldehydes or ketones, yields in a similar manner other 4 - hexafluoroisopropylidene - 1,3 - dithietanes of the structure defined in the general formula previously set forth. Additional examples of specific products of this invention are given in the table below. The first column lists by name the thiocarbonyl or carbonyl compound reacted with the bis(trifluoromethyl)thioketene. Opposite each one, the second column shows the formula of the radicals R and R', or of the radical R+R', as the case may be, in the resulting reaction product, the latter having the general formula

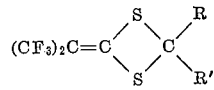

where R and R' have the previously stated significances.

TABLE

| Starting Material | R and R' in Reaction Product |
|---|---|
| Thioacetone | R=R'=CH₃— |
| Methyl ethyl thioketone | R=CH₃—, R'=C₂H₅— |
| Di-n-propyl thioketone | R=R'=CH₃CH₂CH₂— |
| Diisobutyl thioketone | R=R'=(CH₃)₂CHCH₂— |
| Methyl cyclohexyl thioketone | R=CH₃—, R'=CH₂—CH₂—CH₂—CH₂—CH— with CH₂—CH₂ |
| Cyclopentanethione | R+R'= CH₂—CH₂ / CH₂—CH₂ |
| 2-methylcyclohexanethione | R+R'=H₂C CH₂—CH₂ / CH₂—CH with CH₃ |
| Thiomenthone | R+R'=H₂C with CH₃, CH—CH₃, CH₂—CH, C(CH₃)₂ |
| Thiocamphor | R+R'=H₂C with CH₃, CH₃—C—CH₃, H₃C—C—CH₃, CH—CH₂ |
| Cycloheptanethione | R+R'= H₂C—CH₂—CH₂ / H₂C—CH₂—CH₂ |
| 1,1,1-trifluorothioacetone | R=CH₃—, R'=CF₃— |
| Perfluoro-4-heptanethione | R=R'=CF₃CF₂CF₂— |
| 1,1,1,3,3,4,4-heptafluoro-2-butanethione | R=CF₃—, R'=HCF₂CF₂— |
| 4-chloroheptafluoro-2-butanethione | R=CF₃—, R'=ClCF₂CF₂— |
| Perfluoro-2-nonanethione | R=CF₃—, R'=CF₃(CF₂)₆— |
| 1,1,1,3,3-pentafluoro-2-butanethione | R=CF₃—, R'=CH₃CF₂— |
| 1,1,2,2-tetrafluoro-3-pentanethione | R=HCF₂CF₂—, R'=C₂H₅— |
| Thioacetophenone | R=CH₃—, R'=C₆H₅— |
| Trifluorothioacetophenone | R=CF₃—, R'=C₆H₅— |
| 4-chlorothiobenzophenone | R=C₆H₅—, R'=Cl—⟨C₆H₄⟩— |
| 4,4-dichlorothiobenzophenone | R=R'=Cl—⟨C₆H₄⟩— |
| 4,4'-dibromothiobenzophenone | R=R'=Br—⟨C₆H₄⟩— |
| 4,4'-dimethylthiobenzophenone | R=R'=H₃C—⟨C₆H₄⟩— |
| 2,2'-dimethoxythiobenzophenone | R=R'=⟨C₆H₄⟩— with OCH₃ |
| 4,4'-diethoxythiobenzophenone | R=R'=C₂H₅O—⟨C₆H₄⟩— |
| 4-phenylthiobenzophenone | R=C₆H₅—, R'=C₆H₅—C₆H₄— |
| 1-naphthyl phenyl thioketone | R=C₆H₅—, R'=C₁₀H₇— |
| 4,4'-bis(dipropylamino)-thiobenzophenone | R=R'=(C₃H₇)₂N—⟨C₆H₄⟩— |
| p-Di(n-hexylamino)benzaldehyde | R=H, R'=(C₆H₁₃)₂N—⟨C₆H₄⟩— |

The compounds of the present invention are useful as textile-treating agents, such as antistatic agents for wool. Strips of wool fabric were dipped in separate respective solutions in dichloromethane of 1% by weight of each of the compounds of the examples and then dried. The strips were next laid on a glass surface and stroked with a plastic rod in a standard manner. The strips were then held in a vertical position and the attraction, or lack thereof, to the glass rod was noted. In each case, the attraction of the treated strips to the rod was greatly reduced or nearly eliminated compared to an untreated control strip which was strongly attracted. This shows that much less static charge was built up on the treated strips.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

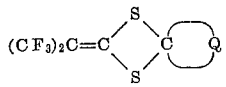

wherein Q is selected, in amount sufficient to satisfy the valences of the depicted attached carbon, from the group consisting of:

lower alkyl; lower fluoroalkyl; cycloalkyl of 5 to 6 ring carbons; 1- to 2-ring aryl having 0–2 substituents selected from the group consisting of halogen, lower alkyl, lower alkoxy and lower dialkylamino;
one hydrogen and one di(lower alkyl)-aminophenyl; and
alkylene forming a 5- to 7-membered ring with the depicted attached carbon.

2. 2,2-diphenyl-4-[2,2,2-trifluoro - 1 - (trifluoromethyl)ethylidene]-1,3-dithietane.

3. 2,2-bis(p - dimethylaminophenyl) - 4 - [2,2,2-trifluoro-1-(trifluoromethyl)ethylidene]1,3-dithietane.

4. 2-(p-dimethylaminophenyl) - 4 - [2,2,2-trifluoro-1-(trifluoromethyl)ethylidene]-1,3-dithietane.

5. 2-(p-diethylaminophenyl) - 4 - [2,2,2 - trifluoro-1-(trifluoromethyl)ethylidene]-1,3-dithietane.

6. 2,2-bis(trifluoromethyl) - 4 - [2,2,2-trifluoro-1-(trifluoromethyl)ethylidene]-1,3-dithietane.

7. The process which comprises reacting, at a temperature in the range of −20 to 50° C., bis(trifluoromethyl)thioketene with a thioketone of the formula

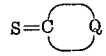

wherein Q is selected, in amount sufficient to satisfy the valences of the depicted attached carbon, from the group consisting of:

lower alkyl; lower fluoroalkyl; cycloalkyl of 5 to 6 ring carbons; 1- to 2-ring aryl having 0–2 substituents selected from the group consisting of halogen, lower alkyl, lower alkoxy and lower dialkylamino; and
alkylene forming a 5- to 7-membered ring with the depicted attached carbon.

8. The process which comprises reacting, at a temperature in the range of −20 to 50° C., bis(trifluoromethyl)thioketene with thiobenzophenone.

9. The process which comprises reacting, at a temperature in the range of −20 to 50° C., bis(trifluoromethyl)thioketene with 4,4' - bis(dimethylamino)thiobenzophenone.

10. The process which comprises reacting, at a temperature in the range of −20 to 50° C., bis(trifluoromethyl)thioketene with hexafluorothioacetone.

11. The process which comprises reacting, at a temperature in the range of −20 to 50° C., bis(trifluoromethyl)thioketene with a compound of the formula

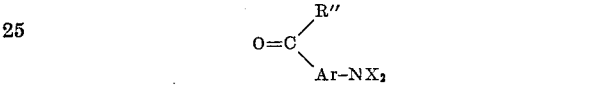

wherein
R" is selected from the group consisting of Ar'—NX$_2$ and hydrogen;
Ar and Ar' are 1- to 2-ring arylene; and
X is lower alkyl.

12. The process which comprises reacting, at a temperature in the range of −20 to 50° C., bis(trifluoromethyl)thioketene with 4,4'-bis(dimethylamino)benzophenone.

13. The process which comprises reacting, at a temperature in the range of −20 to 50° C., bis(trifluoromethyl)thioketene with p-dimethylaminobenzaldehyde.

14. The process which comprises reacting, at a temperature in the range of −20 to 50° C., bis(trifluoromethyl)thioketene with p-diethylaminobenzaldehyde.

No references cited.

WALTER A. MODANCE, *Primary Examiner.*

JAMES A. PATTEN, *Assistant Examiner.*